July 24, 1934.      L. E. LA BRIE      1,967,411
BRAKE
Filed Feb. 16, 1928
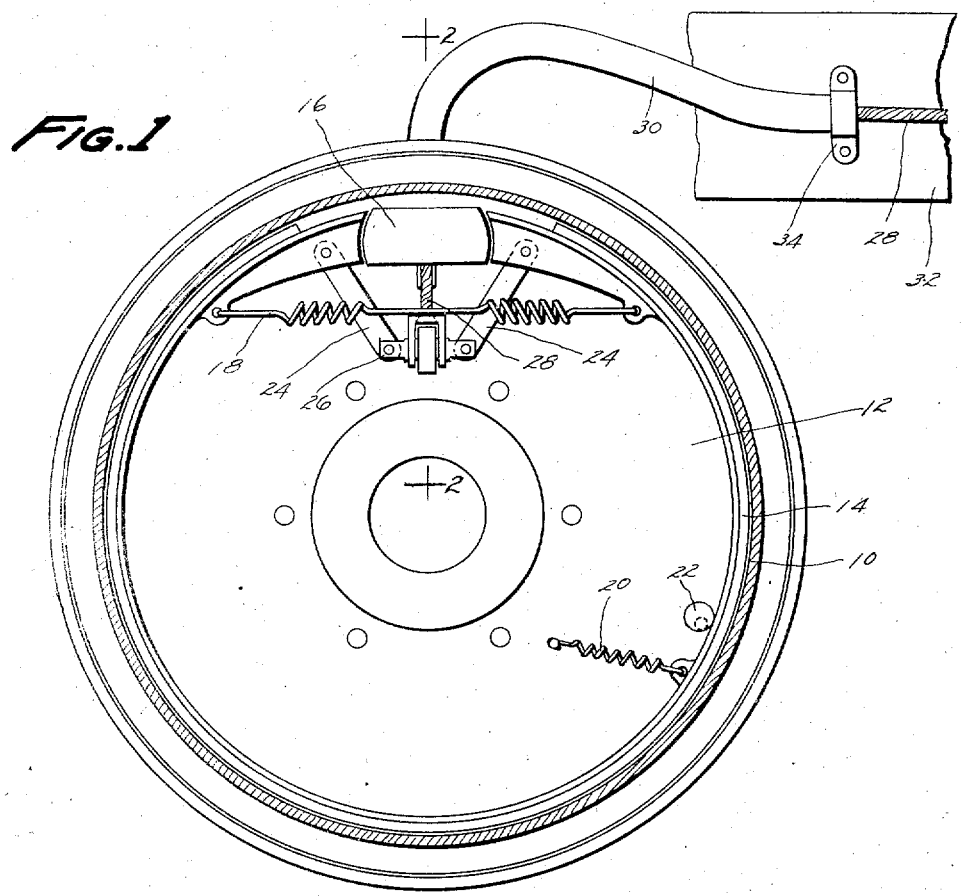
Fig. 1
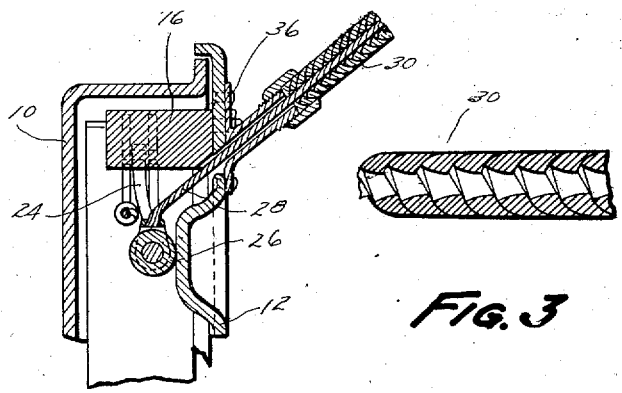
Fig. 2
Fig. 3
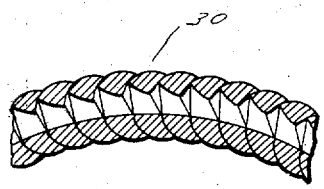
Fig. 4
INVENTOR
*LUDGER E. LA BRIE*
BY
*Jn. W. McConkey*
ATTORNEY Patented July 24, 1934

1,967,411

UNITED STATES PATENT OFFICE 1,967,411

BRAKE

Ludger E. La Brie, South Bend, Ind., assignor to Bendix Brake Company, South Bend, Ind., a corporation of Illinois Application February 16, 1928, Serial No. 254,660

24 Claims. (Cl. 188—78)

This invention relates to brakes, and is illustrated as embodied in an internal expanding brake for a front automobile wheel. An object of the invention is to provide simple operating means for a brake of the type which has one part anchor when the drum is turning in one direction and a different part anchor when the drum is turning in the other direction, which means will operate in such a manner as to cause the drum friction to hold one or the other of said parts anchored during the application of the brake.

In one desirable arrangement, a toggle or the like draws a part, such as one or both of the ends, of the friction means against the drum, preferably by drawing the friction means bodily against the drum without substantially expanding it. Then the toggle is straightened, while the drum friction holds one end or the other of the friction means anchored, to augment by its expanding action the brake-applying pressure of the drum friction.

I prefer to use a cable or similar tension element extending radially outward, to operate the above-described toggle, or an equivalent applying device, especially as the cable may be led through the brake backing plate at an acute angle and thence through a Bowden type casing to the chassis frame, thus eliminating most of the parts of the conventional applying means while at the same time obviating all shifting of the brake friction means after the brake is once applied.

The above and other objects and features of the invention, including various novel combinations of parts and desirable particular constructions, will be apparent from the following description of one illustrative embodiment shown in the accompanying drawing, in which:

Figure 1 is a vertical section through the brake just inside the head of the brake drum, showing the friction means in side elevation;

Figure 2 is a section through the brake on the line 2—2 of Figure 1;

Figure 3 is a section lengthwise through a part of the novel Bowden-type casing when it is straight; and Figure 4 is a similar section when the casing is bent.

The illustrated brake includes a rotatable drum 10, mounted on a front automobile wheel (not shown), at the open side of which is a support such as a backing plate 12, and within which is mounted the friction means of the brake, shown in the drawing as a continuous friction band 14, of steel faced with brake lining.

The band 14, or its equivalent, has two ends which are separable to expand the band against the drum 10 in applying the brake, and between which is arranged an anchor abutment 16 secured to the backing plate. One end of band 14 anchors against abutment 16 when the drum is turning clockwise, and the other end anchors when the drum is turning counter-clockwise. A main return spring 18 urges the band away from the drum by drawing its ends together, thus contracting the band, while an auxiliary return spring 20 urges a part of the band against an adjustable eccentric stop 22 about 90 degrees from abutment 16 at one side of the brake.

The brake is applied by a device such as a toggle 24, comprising links connected to the ends of the band, and having its knuckle between said ends and the drum axis; that is the toggle angle opens radially outward. The toggle is preferably provided with a guide member 26 adjacent its knuckle in sliding engagement with the backing plate 12.

The toggle or its equivalent is connected at its knuckle to a tension element, such as a steel cable 28 extending radially upward and through the backing plate 12 at an acute angle, and thence through a novel Bowden-type casing 30 looped back into a horizontal position and terminating adjacent a side member 32 of the chassis frame, where it is secured by a bracket 34 while the cable continues rearwardly to be connected to the operating mechanism. The forward end of the casing 30 is secured to a bracket 36 carried by the backing plate 12 and having a suitable fitting to which the casing is secured.

As best shown in Figures 3 and 4, the novel Bowden-type casing 30 is made of a helically-wound steel wire, heat-treated after winding, and which is generally triangular in cross-section. The apex of the triangle is outward, and its sides are circular arcs, the two sides which slidably engage in adjacent coils having their centers of curvature in the casing axis, so that bending the casing does not change the length of the axis and therefore does not affect the tension on cable 28. The bases of the various triangles, formed by cutting the coils as in Figures 3 and 4, have their centers of curvature some distance outside the casing, so that a normal bend, as in Figure 4, leaves a smoothly-curved surface for the cable 28 to slide over.

In operation, tension on cable 28 first lifts the friction means bodily upward, to draw its ends against the drum 10 before they draw away from 16, against which the ends are still held by spring 18, which is made strong enough for that purpose.

Thus the friction of the rotating drum acts directly to hold one of the ends in anchoring engagement with abutment 16 and to urge the other end away from the abutment to expand the band to apply the brake.

Further tension on cable 28 serves to straighten the toggle 24, thus augmenting the brake-applying pressure of the drum friction, and fully applying the brake.

By this method of operation, the drum friction in effect predetermines the anchorage of the brake, so that there is no shifting of the friction means after the brake is applied, in either direction of drum rotation.

While one illustrative embodiment has been described in detail, it is not my intention to limit the scope of the invention to that particular embodiment, or otherwise than by the terms of the appended claims. Part of the subject-matter disclosed herein is claimed in my divisional application No. 517,744, filed February 24, 1931.

I claim:

1. A brake comprising, in combination, a drum, a fixed anchor, a continuous expansible friction band within the drum having the anchor between its ends, a toggle connected to said ends having its knee between said ends and the drum axis, and a tension element connected to said knee extending radially outward and operative in applying the brake first to draw the band bodily outward to force said ends against the drum before either end leaves the anchor and then operates to force said ends apart to augment the brake-applying effect while the drum friction holds the selected end against the anchor.

2. A brake comprising, in combination, a drum, a fixed anchor, a continuous expansible friction band within the drum having said anchor between its ends, and means operative in applying the brake first to move the band bodily outward to force said ends against the drum before either end leaves said anchor and then operates to force said ends apart to augment the brake-applying effect of the drum friction while the drum friction holds one or the other of said ends anchored.

3. A brake comprising, in combination, a drum, a support at the open side of the drum, an anchor on the support means within the drum having ends separable to expand said means and arranged to have one part anchor when the drum is turning in one direction and to have a different part anchor when the drum is turning in the other direction, an outwardly opening toggle within the drum acting on said ends, and a tension element connected to the knuckle of the toggle the principal component of which is radially acting, said element extending through the anchor and acting on said toggle to move the friction means bodily against the drum without disengaging the anchor and then acting to straighten the toggle to expand the friction means against the drum.

4. A brake comprising, in combination, a drum, a support such as a backing plate at the open side of the drum, friction means within the drum arranged to have one part anchor when the drum is turning in one direction and to have a different part anchor when the drum is turning in the other direction, an applying device within the drum acting on the friction means, a tension element connected to the applying device and extending outward angularly of the drum and through the support at an acute angle and acting on said applying device to move the friction means bodily against the drum so that the drum friction holds one or the other of said parts anchored and then acting on said device to expand the friction means against the drum.

5. A brake comprising, in combination, a drum, a support at the open side of the drum, a fixed anchor on the support friction means within the drum arranged one part to anchor when the drum is turning in one direction and to have a different part anchor when the drum is turning in the other direction, an applying device within the drum acting on the friction means, a tension element connected to the applying device and extending outwardly of the drum and through the support and acting on said applying device to move the friction means bodily against the drum without disengaging the anchor, so that the drum friction holds one or the other of said parts against the anchor and then acting on said device to expand the friction means against the drum.

6. A brake comprising, in combination, a drum, a support such as a backing plate at the open side of the drum, friction means within the drum having ends separable to expand said means and arranged to have one part anchor when the drum is turning in one direction and to have a different part anchor when the drum is turning in the other direction, an outwardly opening toggle within the drum acting on said ends, and a tension element connected to the knuckle of the toggle and extending outwardly of the drum and through the support at an acute angle and acting on said toggle to move the friction means bodily against the drum so that the drum friction holds one or the other of said parts anchored and then acting to straighten the toggle to expand the friction means against the drum, said toggle having a part adjacent the knuckle which slidably engages the inner face of said support in such a manner as to take the side thrust of said tension element.

7. A brake comprising, in combination, a drum, floating friction means having alternatively-effective anchoring parts, an anchor between and engaged by said parts, and a toggle arranged to move a portion of the friction means against the drum while both of said parts remain in engagement with the anchor to cause the drum friction to hold one or the other of said parts anchored and which is arranged then to act to expand the friction means to augment the brake-applying action of the drum friction, together with a spring resisting the expansion means until it engages the drum, so that the drum friction determines the anchorage prior to full application of the brake.

8. A brake comprising, in combination, a drum, floating friction means having separable alternatively-effective anchoring ends, an anchor between said ends and a toggle arranged to move at least one of said ends radially against the drum to cause the drum friction to hold one or the other of said ends anchored and which is arranged then to act to expand the friction means to augment the brake applying action of the drum friction, together with a spring resisting the expansion means until it engages the drum, so that the drum friction determines the anchorage prior to full application of the brake.

9. A brake comprising a fixed support, an anchor on the support, a drum associated with the support, a floating friction means on the support having separable ends adaptable for cooperation with the anchor, a toggle connected to the separable ends of the friction means adapted to engage the separable ends of the friction means with the drum without disengaging the separable ends from the anchor and to spread the friction means in engagement with the drum.

10. A brake comprising a fixed support, an anchor on the support, a rotatable drum associated with the support, a floating friction means on the fixed support having separable ends engaging the anchor, a toggle connected between the separable ends and means for actuating the toggle to engage the separable ends of the friction means with the drum without disengaging the anchor and to spread the separable ends of the friction element for braking engagement.

11. A brake comprising a fixed support, an anchor on the support, a rotatable drum associated with the support, a floating friction element on the support having separable ends, a tension member normally holding the separable ends of the friction means in engagement with the anchor, a toggle connected between the separable ends of the friction element and means for actuating the toggle to bring about engagement of the separable ends of the friction element with the drum without disengaging the anchor upon initial movement of the toggle and to spread the separable ends into braking engagement upon further movement of the toggle.

12. A brake comprising a fixed support, an anchor on the support, a ratatable drum associated with the support, a friction element movable on the support, a tension member for normally retaining the separable ends of the friction element in engagement with the anchor, a toggle connecting the separable ends of the friction element and a tension member connected to the knee of the toggle and extending through the anchor to the back of the support.

13. A brake comprising a fixed support, an anchor on the support, a drum associated with the support, a friction element positioned for movement on the support, a tension member connecting the respective ends of the friction element normally holding the separable ends of the friction element on the anchor, means for moving the friction element to engage the separable ends of the friction element with the drum without disengaging the anchor upon initial movement of the friction element and to spread the separable ends of the friction element for braking engagement upon further movement.

14. A brake comprising, in combination, a drum, friction means, one part of which anchors when the drum is turning in one direction and a different part of which anchors when the drum is turning in the other direction, and operating means for the brake including a flexible tension element pulling generally radially in a direction to draw the anchoring parts of the friction means bodily against the drum prior to full application of the brake to cause the drum friction to hold one or the other of said parts anchored during the application of the brake.

15. A brake comprising, in combination, a drum, friction means, one part of which anchors when the drum is turning in one direction and a different part of which anchors when the drum is turning in the other direction and which has separable ends movable to expand the friction mean against the drum, and operating means for the brake including a flexible tension element pulling generally radially outward on said ends in a direction to draw the ends of the friction mean bodily against the drum prior to full application of the brake to cause the drum friction to hold one or the other of said parts anchored during the application of the brake, and then operative to force said ends apart to augment the brake-applying action of the drum friction.

16. A brake comprising, in combination, a drum, friction means, one part of which anchors when the drum is turning in one direction and a different part of which anchors when the drum is turning in the other direction and which has separable ends movable to expand the friction means against the drum, and operating means for the brake including a toggle connected to said ends and with its knuckle between said ends and the drum axis, and which is operatively connected to a flexible tension element pulling generally radially outward on said ends in a direction to draw the friction means bodily against the drum prior to full application of the brake to cause the drum friction to hold one or the other of said parts anchored during the application of the brake, and then operative to force said ends apart to augment the brake-applying action of the drum friction.

17. A brake comprising, in combination, a drum, a support at the open side of the drum, friction means within the drum arranged to have one part anchor when the drum is turning in one direction and to have a different part anchor when the drum is turning in the other direction, an applying device within the drum acting on the friction means, and a tension element connected to the applying device and extending outward radially of the drum and through the support at an acute angle and acting on said applying device to move the friction means bodily against the drum so that the drum friction holds one or the other of said parts anchored and then acting on said device to expand the friction means against the drum.

18. A brake comprising, in combination, a drum, friction means engageable with the drum and arranged to have one part anchor when the drum is turning in one direction and to have a different part anchor when the drum is turning in the other direction, and a toggle operative first to move at least one of the anchoring parts of the friction means against the drum in such a manner as to be urged by the drum friction in a direction to hold one or the other of said parts in anchored position and then operative to expand the friction means to augment the brake-applying action of the drum friction.

19. A brake comprising, in combination, a drum, friction means having separable ends which is engageable with the drum and which is arranged to have one part anchor when the drum is turning in one direction and to have a different part anchor when the drum is turning in the other direction, and a toggle acting on said ends and operative first to move at least one of said ends against the drum while still in anchored position in such a manner as to be urged by the drum friction in a direction to hold one or the other of said parts in anchored position and then operative to force said ends apart to expand the friction means to augment the brake-applying action of the drum friction.

20. A brake comprising, in combination, a drum, friction means engageable with the drum and arranged to have one part anchor when the drum is turning in one direction and to have a different part anchor when the drum is turning in the other direction, and a toggle operative first to move the friction means bodily against the drum without expanding it so that the drum friction will hold one or the other of said parts in anchored position, and which is then operative to expand the friction means against the drum.

21. A brake comprising, in combination, a drum, an anchor, floating friction means having alternatively-effective anchoring parts engaging said anchor, and a toggle arranged to move a portion of the friction means against the drum while both of said parts are in engagement with the anchor to cause the drum friction to hold one or the other of said parts anchored and which is arranged then to act to expand the friction means to augment the brake-applying action of the drum friction.

22. A brake comprising, in combination, a drum, floating friction means having alternatively-effective anchoring parts, and a toggle arranged to move a portion of the friction means against the drum while both of said parts remain in anchored position to cause the drum friction to hold one or the other of said parts anchored.

23. A brake comprising, in combination, a drum, floating friction means having separable alternatively-effective anchoring ends, an anchoring stop between said ends and a toggle arranged to move at least one of said ends against the drum while it is held in slidable engagement with said stop to cause the drum friction to hold one or the other of said ends anchored against the stop and which is arranged then to act to expand the friction means to augment the brake-applying action of the drum friction.

24. A brake comprising, in combination, a drum, floating friction means having separable alternatively-effective anchoring ends, an anchoring stop between said ends and a toggle arranged to move at least one of said ends against the drum while it is held in engagement with said stop to cause the drum friction to hold one or the other of said ends anchored.

LUDGER E. LA BRIE.

CERTIFICATE OF CORRECTION.

Patent No. 1,967,411.  July 24, 1934.

LUDGER E. LA BRIE.

It is hereby certified that error appears in the printed specification of the above numbered patent requiring correction as follows: Page 2, line 48, claim 3, after "support" insert the comma and word , friction; page 3, line 28, claim 12, for "ratatable" read rotatable; and lines 68 and 72, claim 15, for "mean" read means; and that the said Letters Patent should be read with these corrections therein that the same may conform to the record of the case in the Patent Office.

Signed and sealed this 19th day of March, A. D. 1935.

Leslie Frazer (Seal)  Acting Commissioner of Patents.

tive to expand the friction means against the drum.

21. A brake comprising, in combination, a drum, an anchor, floating friction means having alternatively-effective anchoring parts engaging said anchor, and a toggle arranged to move a portion of the friction means against the drum while both of said parts are in engagement with the anchor to cause the drum friction to hold one or the other of said parts anchored and which is arranged then to act to expand the friction means to augment the brake-applying action of the drum friction.

22. A brake comprising, in combination, a drum, floating friction means having alternatively-effective anchoring parts, and a toggle arranged to move a portion of the friction means against the drum while both of said parts remain in anchored position to cause the drum friction to hold one or the other of said parts anchored.

23. A brake comprising, in combination, a drum, floating friction means having separable alternatively-effective anchoring ends, an anchoring stop between said ends and a toggle arranged to move at least one of said ends against the drum while it is held in slidable engagement with said stop to cause the drum friction to hold one or the other of said ends anchored against the stop and which is arranged then to act to expand the friction means to augment the brake-applying action of the drum friction.

24. A brake comprising, in combination, a drum, floating friction means having separable alternatively-effective anchoring ends, an anchoring stop between said ends and a toggle arranged to move at least one of said ends against the drum while it is held in engagement with said stop to cause the drum friction to hold one or the other of said ends anchored.

LUDGER E. LA BRIE.

CERTIFICATE OF CORRECTION.

Patent No. 1,967,411.     July 24, 1934.

LUDGER E. LA BRIE.

It is hereby certified that error appears in the printed specification of the above numbered patent requiring correction as follows: Page 2, line 48, claim 3, after "support" insert the comma and word , friction; page 3, line 28, claim 12, for "ratatable" read rotatable; and lines 68 and 72, claim 15, for "mean" read means; and that the said Letters Patent should be read with these corrections therein that the same may conform to the record of the case in the Patent Office.

Signed and sealed this 19th day of March, A. D. 1935.

(Seal)

Leslie Frazer
Acting Commissioner of Patents.